United States Patent Office 2,887,488
Patented May 19, 1959

2,887,488

PIPERAZINE DERIVATIVES

Robert A. Smiley, Woodbury, N.J., assignor to E. I. du Pont de Nemours and Company, Wilmington, Del., a corporation of Delaware No Drawing. Application September 23, 1957
Serial No. 685,413

30 Claims. (Cl. 260—268)

The present invention relates to novel nitro and amino compounds and their preparation. More particularly, the present invention relates to novel dinitro compounds, N,N'-bis[(1-nitrocycloalkyl)methyl]piperazines, and novel tetramino compounds, N,N'-bis[(1-aminocycloalkyl)methyl]piperazines, and a method of preparing the same. This application is a continuation-in-part of my copending applications Serial Nos. 539,261 and 539,262, filed October 19, 1955, both now abandoned.

In general, nitro compounds have found widespread application because of the ease with which they are reduced to amines, valuable as corrosion inhibitors and emulsifiers and in the production of dyes, detergents, textile softeners, and photographic compounds. Recently, amines have been used widely as curing agents for epoxy resins; however, epoxy resins cured by most amines now commonly used for this purpose are dark, almost black, in color and have relatively low heat-distortion temperatures.

Accordingly, an object of the present invention is to provide new nitro compounds which are intermediates of valuable new amines. A still further object of the present invention is to provide valuable new amino compounds which are readily prepared by hydrogenation of the corresponding intermediate nitro compounds and constitute superior epoxy-resin curing agents. Another object of the present invention is to provide valuable new nitro and amino compounds by an economically feasible process. Other objects will become apparent as the invention is further described.

I have found that the foregoing objects may be achieved when I mix together a nitro cycloalkane, formaldehyde, and piperazine or a C-substituted alkyl piperazine, to produce an N,N'-bis[(1-nitrocycloalkyl)methyl]piperazine and, thereafter, catalytically hydrogenate the intermediate nitro compound to form an N,N'-bis[(1-aminocycloalkyl)methyl]piperazine.

In accordance with the process of the present invention, a nitro cycloalkane, formaldehyde, and piperazine or a C-substituted alkyl piperazine are mixed together at a temperature within the range of the freezing point and the boiling point of the mixture to provide an N,N'-bis[(1-nitrocycloalkyl)methyl]piperazine that may then be catalytically hydrogenated at a temperature within the range of the freezing point and the boiling point of the reaction mixture and at atmospheric or superatmospheric pressure to the corresponding amine. The following examples serve to illustrate specific embodiments of the method of carrying out the process of the present invention. However, they will be understood to be illustrative only and not to limit the invention in any manner. The parts in the examples are parts by weight unless otherwise designated.

Example 1

To a reaction vessel containing 205 parts of 95% ethanol were added 65 parts of nitrocyclohexane, 50 parts of a 36% aqueous solution of formaldehyde, and 49 parts of piperazine hydrate. The mixture was stirred for one hour at room temperature. At the end of this time, the thick slurry of precipitated N,N'-bis[(1-nitrocyclohexyl)methyl]piperazine which had formed was heated on a steam bath for an additional two hours. The dinitro compound was then in the form of crystalline plates. The slurry was cooled; the solid material was removed by filtration and reslurried in 123 parts of fresh 95% ethanol. The latter mixture was filtered, and the solid material was dried. An 87.5% yield (81 parts) of N,N'-bis[(1-nitrocyclohexyl)methyl]piperazine was obtained.

Example 2

Nitrocyclohexane in the amount of 65 parts, 50 parts of a 36% aqueous solution of formaldehyde, 49 parts of piperazine hydrate, and 11 parts of a 10% aqueous solution of sodium hydroxide were added to a reaction vessel containing 205 parts of 95% ethanol. The mixture was stirred at room temperature for one hour. At the end of this time, the thick slurry of precipitated N,N'-bis[(1-nitrocyclohexyl)methyl]piperazine which had formed was heated on a steam bath for an additional two hours. The reaction mixture then was worked up according to the method described in Example 1. A 92.5% yield (85 parts) of the dinitro compound was obtained.

Example 3

To a reaction vessel containing 820 parts of 95% ethanol were added 258 parts of nitrocyclohexane, 200 parts of a 36% aqueous solution of formaldehyde, 194 parts of piperazine hydrate, and 4 parts of tetraethylammonium hydroxide as a 10% aqueous solution. The mixture was stirred for four hours at room temperature. At the end of this time, the thick slurry of precipitated N,N'-bis[(1-nitrocyclohexyl)methyl]piperazine which had formed was heated on a steam bath for an additional two hours. The reaction mixture then was worked up according to the method described in Example 1, and 339 parts (92% yield) of the dinitro compound was obtained.

Example 4

Nitrocyclohexane in the amount of 129 parts, 100 parts of a 36% aqueous solution of formaldehyde, 97 parts of piperazine hydrate, and 2 parts of tetraethylammonium hydroxide as a 10% aqueous solution were stirred together at room temperature for one hour. At the end of this time, the reaction mixture, which was solid in appearance, was pressed dry, slurried in hot 95% ethanol, cooled, and filtered. After recrystallization of the solid material from benzene, the solids were dried. A 77% yield (142 parts) of N,N'-bis[(1-nitrocyclohexyl)methyl]piperazine, melting point 186–188° C., was obtained.

The N,N'-bis[(1-nitrocyclohexyl)methyl]piperazine was characterized by elemental and infrared analyses. The elemental analysis was as follows:

Found: C, 58.87; H, 8.63, 8.74; N, 15.49, 15.58
Calcd. for $C_{18}H_{32}N_4O_4$: C, 58.65; H, 8.69; N, 15.21

A very strong nitro band was found at $6.54\mu$ by infrared analysis. Because primary and secondary nitro groups absorb below $6.50\mu$, the appearance of the band at $6.54\mu$ indicated the presence of a tertiary nitro group. No bands were present for any other functional groups.

Example 5

To an autoclave were charged 184 parts of N,N'-bis-[(1-nitrocyclohexyl)methyl]piperazine, 820 parts of 95% ethanol, and about 10 parts of Raney nickel. The autoclave was pressurized at room temperature with hydrogen to 750 p.s.i., and this pressure was maintained for six hours, the temperature rising as high as 43° C. At the end of this time, the absorption of hydrogen ceased, and the autoclave was cooled and vented. The reaction mixture was removed from the autoclave, and the catalyst and insoluble materials were removed from the mixture by filtration. The filtrate was distilled under reduced pressure to strip off the ethanol, the distillation residue was slurried in cold acetone, and the insoluble tetramine was separated from the slurry by filtration and then was dried. One hundred and ten parts of the dried material was obtained and recrystallized from acetone. From the recrystallization was recovered 99 parts of the tetramine. The acetone filtrates were combined, and the volume of the filtrates was reduced by evaporation. After the combined and concentrated filtrates were cooled, 26 parts of the tetramine was recovered by filtration. The total yield of N,N'-bis[(1-aminocyclohexyl)methyl]piperazine was 125 parts (83.5% yield).

Example 6

N,N'-bis[(1-nitrocyclohexyl)methyl]piperazine in the amount of 37 parts, 164 parts of 95% ethanol, and about 2 parts of Raney nickel were shaken in a Parr shaker bottle at room temperature and at an initial hydrogen pressure of 60 p.s.i. The pressure gradually decreased, and when it reached 45 p.s.i., the reaction vessel was repressurized to 60 p.s.i. After repressurization, the pressure dropped and finally reached 24 p.s.i. When the pressure ceased dropping, about twenty-one hours after the start of the run, the reaction mixture was worked up according to the method described in Example 5. A 65% yield of N,N'-bis[(1-aminocyclohexyl)methyl]-piperazine was obtained.

The N,N'-bis[(1-aminocyclohexyl)methyl]piperazine, which is a white, crystalline, nonhygroscopic solid melting at 84–85° C., was characterized by elemental and infrared analyses and by its neutralization equivalent. The elemental analysis was as follows:

Found: C, 69.81, 69.98; H, 11.56, 11.69; N, 18.10, 18.18
Calcd. for $C_{18}H_{36}N_4$: C, 70.10; H, 11.69; N, 18.19

No nitro band was found by infrared analysis, whereas a weak N—H band was found at $3.05\mu$ and a broad primary amine band was found at $6.40\mu$. The neutralization equivalent of the tetramine was found by analysis to be $155.2 \pm 0.5$; the theoretical neutralization equivalent of this compound is 154.3.

Example 7

Nitrocyclohexane in the amount of 129 parts, 100 parts of a 36% aqueous solution of formaldehyde, and 44 parts of 2-methylpiperazine were dissolved in 410 parts of 95% ethanol. The resultant solution was stirred at room temperature for four hours. At the end of this time, the thick slurry of precipitated N,N'-bis[(1-nitrocyclohexyl)methyl]-2-methylpiperazine which had formed was heated on a steam bath for two hours and then allowed to stand at room temperature for about sixteen hours. Then, the solid mass was slurried with 500 parts of water. The slurry was filtered to remove the solids, which then were washed with ethanol and dried. A 73% yield (139 parts) of the dinitro compound, melting point 122–123° C., was obtained.

Analysis:
Found: C, 59.40, 59.63; H, 8.46, 8.57; N, 14.74, 14.91
Calcd. for $C_{19}H_{34}N_4O_4$: C, 59.65; H, 8.90; N, 14.65

Example 8

About 5 parts of Raney nickel and 38 parts of N,N'-bis[(1-nitrocyclohexyl)methyl]-2-methylpiperazine were added to 158 parts of absolute ethanol in a Parr shaker, and hydrogen was introduced into the reactor. The hydrogenation was carried out at room temperature and at 10–50 p.s.i. hydrogen pressure until the absorption of hydrogen ceased. Then, the reactor was cooled and vented. The catalyst was removed from the reaction mixture by filtration, and the ethanol was removed from the filtrate by evaporation under an atmosphere of nitrogen. The liquid residue was distilled. Twenty-four parts (73% yield) was obtained of N,N'-bis[(1-aminocyclohexyl)methyl]-2-methylpiperazine, a viscous liquid having a boiling point of 174–179° C. ($n_D^{30}$ 1.5086).

Analysis:
Found: C, 69.84, 70.11; H, 11.63, 11.53; N, 17.30, 17.35
Calcd. for $C_{19}H_{38}N_4$: C, 70.80; H, 11.80; N, 17.39

Example 9

Fifty parts of 36% aqueous solution of formaldehyde, 65 parts of nitrocyclohexane, 32 parts of trans-2,5-dimethylpiperazine, and 7 parts of tetraethanolammonium hydroxide as a 40% aqueous solution were added to 205 parts of 95% ethanol. The resultant solution was stirred at room temperature for two hours, during which time a large amount of precipitate formed. The mixture then was refluxed for an hour. After the mixture was cooled, the precipitated product, N,N'-bis[(1-nitrocyclohexyl)methyl]-trans-2,5-dimethylpiperazine, was removed by filtration. The white solid was washed with ethanol and dried. A 76% yield (75 parts) of the dinitro compound, melting point 149–150° C., was obtained.

Example 10

The procedure of Example 9 was repeated with the exception that cis-2,5-dimethylpiperazine was substituted for the trans isomer. A yield of 79% (78 parts) of N,N'-bis[(1-nitrocyclohexyl)methyl] - cis-2,5 - dimethylpiperazine, melting point 122–124° C., was obtained.

Example 11

The procedure of Example 9 was repeated with the exception that a mixture of the cis and trans isomers of 2,5-dimethylpiperazine was substituted for the trans isomer. A mixture of the two isomeric forms of N,N'-bis[(1 - nitrocyclohexyl)methyl]2,5 - dimethylpiperazine was obtained in the amount of 66 parts (66% yield).

The N,N'-bis[(1-nitrocyclohexyl)methyl]-2,5-dimethylpiperazine was characterized by elemental analysis.

Analysis:
Found: C, 60.25, 60.39; H, 8.93, 9.02; N, 13.86, 13.93
Calcd. for $C_{20}H_{36}N_4O_4$: C, 60.60; H, 9.09; N, 14.13

Example 12

Thirty-three parts of N,N'-bis[(1-nitrocyclohexyl)methyl]-2,5-dimethylpiperazine and about 5 parts of Raney nickel were added to 158 parts of absolute ethanol in a Parr shaker, and hydrogen was introduced into the shaker. The hydrogenation was carried out at room temperature and an initial pressure of 48 p.s.i. The pressure gradually decreased and finally reached 8 p.s.i. Then, the reactor was cooled and vented. The contents of the reactor was filtered to remove the catalyst; the filtrate was evaporated under an atmosphere of nitrogen to remove the ethanol. Upon cooling, the residue solidified. The solid material was recrystallized from petroleum ether at $-15°$ C. and dried in a vacuum desiccator. The yield of white, solid N,N'-bis[(1-aminocyclohexyl)methyl]-2,5-dimethylpiperazine (M.P., 71–72° C.) was 21 parts (75%).

Analysis:
Found: C, 71.31, 71.14; H, 11.81, 12.04; N, 16.40, 16.45
Calcd. for $C_{20}H_{40}N_4$: C, 71.85; H, 11.97; N, 16.16

Example 13

Nitrocylopentane in the amount of 58 parts, 50 parts of a 36% aqueous solution of formaldehyde, 49 parts of piperazine hydrate, and 7 parts of tetraethanolammonium hydroxide were dissolved in 205 parts of 95% ethanol. The solution was stirred at room temperature for thirty minutes, during which time a white precipitate formed. Then, the mixture was refluxed on a steam bath for an additional thirty minutes. At the end of this time the mixture was cooled and then filtered. The white solid was washed with ethanol and dried. An 80% yield (68 parts) of N,N'-bis[(1-nitrocyclopentyl)methyl]piperazine, melting point 117° C., was obtained.

The product was characterized by elemental analysis.

Analysis:
 Found: C, 56.56, 56.63; H, 8.16, 8.19; N, 16.26, 16.48
 Calcd. for $C_{16}H_{28}N_4O_4$: C, 56.45; H, 8.23; N, 16.47

*Example 14*

Thirty-four parts of N,N'-bis[(1-nitrocyclopentyl)-methyl]piperazine and about 5 parts of Raney nickel were added to 158 parts of absolute ethanol in a Parr shaker, and hydrogen was introduced into the shaker. The hydrogenation was carried out at room temperature and at 20–50 p.s.i. hydrogen pressure until the absorption of hydrogen ceased. Then, the reactor was cooled and vented. The contents of the reactor was filtered to remove the catalyst; the filtrate was evaporated under an atmosphere of nitrogen to remove the ethanol. Upon cooling, the residue solidified. The solid material was recrystallized from acetone and dried. The yield of white, crystalline N,N'-bis[(1-aminocyclo-pentyl)methyl]piperazine (melting point, 99–100° C.) was 16 parts or 57%.

Analysis:
 Found: C, 68,67, 68.94; H, 11.35, 11.60; N, 20.01, 20.11.
 Calcd. for $C_{16}H_{32}N_4$: C, 68.57; H, 11.42; N, 20.00

In general, the novel dinitro compounds are light-colored, white to pale yellow or tan, solids which are slightly soluble in ethanol and benzene and insoluble in water and dilute acids. The novel amines are insoluble in water, soluble or slightly soluble in acetone, soluble in dilute acid, and very soluble in ethyl ether, petroleum ether, benzene, and cyclohexane.

The N,N'-bis[(1-aminocycloalkyl)methyl]piperazines were found to be excellent curing agents for epoxy resins. The following table illustrates the effectiveness (as indicated by the color and heat distortion temperature of the cured resin) of these novel amines in curing an epoxy resin in a comparison with two other amines now used commercially for this purpose.

| Amine used as Curing Agent | Amt.[1] of Amine (g.) | Appearance of Cured Resin | Heat Distortion Temp. (° C.) |
|---|---|---|---|
| m-Phenylenediamine | 6.21 | black, almost opaque. | 122 |
| Methylenedianiline | 11.39 | very dark | 120 |
| N,N'-bis[(1-amino cyclohexyl) methyl]-piperazine | 17.7 | very light, clear. | 139 |
| N,N'-bis[(1-amino cyclohexyl) methyl]-2-methylpiperazine | 18.3 | light, clear | 133 |
| N,N'-bis[(1-amino cyclopentyl) methyl]-piperazine | 8.0 | light red, clear. | 131 |

In the first four examples, the amine was used to cure 50 grams of Ciba Co. Inc. "Araldite" No. 6020 epoxy resin for 24 hrs. at 120° C. In the last example, the amine was used to cure 25 grams of the epoxy resin for 4 hrs. at 120° C. and then 20 hrs. at 160° C.

[1] Equivalent amts. of each amine (based on the number of active hydrogen atoms) were used.

Additionally, the subject amines are excellent chelating agents for heavy metals, such as copper, cobalt, and nickel. Moreover, the N,N'-bis[(1-aminocycloalkyl)methyl]piperazines find use as metal deactivators because of their high solubility in hydrocarbons and their chelating ability. The novel compounds can be converted to calcium and barium chelates for use as petroleum oil additives.

The N,N'-bis[(1-nitrocycloalkyl)methyl]piperazines were formed in good yields by the reaction of a nitro cycloalkane, formaldehyde, and piperazine or a C-substituted alkyl piperazines in the absence of a catalyst. However, these reactants may be mixed together in the presence of a suitable catalyst. Any base, organic or inorganic, constitutes a suitable catalyst. Included in this classification are quaternary ammonium compounds, e.g., tetramethyl-, tetraethyl-, or tetraethanolammonium hydroxide; alkali metal hydroxides, e.g., sodium, potassium, or lithium hydroxide; alkaline-earth metal hydroxides, e.g., calcium, barium, or strontium hydroxide; sodium carbonate; and anion-exchange resins. Water-soluble bases may be added most conveniently in the form of an aqueous solution; for example, 10% aqueous solutions of tetraethylammonium hydroxide and sodium hydroxide were found to be very effective.

Higher yields of the nitro compound are obtained when the reaction of the nitro cycloalkane, formaldehyde, and the piperazine is carried out in a mutual solvent for all the reactants. Alkanols containing 1 to 3 carbon atoms, e.g., methanol, ethanol, or isopropanol, are the preferred solvents. Furthermore, the nitro cycloalkane, formaldehyde, and the piperazine preferably are present in substantially stoichiometric amounts. However, the use of more than a stoichiometric amount of the formaldehyde is not deleterious to the yields of the dinitro compounds obtained according to the process of the present invention.

As illustrated by the examples, the N,N'-bis[(1-nitrocycloalkyl)methyl]piperazines are converted to the corresponding tetramines in good yields by contacting with hydrogen a mixture of one of the dinitro compounds and a suitable solvent for the resultant tetramine. Such solvents include low-molecular-weight alkanols such as methanol, ethanol, and isopropanol; ethers such as dioxane; hydrocarbons such as benzene, cyclohexane, and petroleum ether; and mixtures of a low-molecular-weight alkanol and water such as a 50/50 mixture of ethanol and water. The dinitro compound is insoluble or only slightly soluble in the reaction medium, whereas the hydrogenation product goes into solution as it is formed in the reaction. The amount of the amine solvent is not critical; enough solvent is used to form a thin slurry or suspension with the dinitro compound. Usually, about a five-fold amount (by weight based on the weight of the dinitro compound) of solvent is sufficient for this purpose.

The hydrogenation of the nitro compound to the amino compound is carried out in the presence of a suitable hydrogenation catalyst. This catalyst may be any one of the well-known catalysts used for this purpose. Such catalysts include Raney nickel; nickel oxides; finely divided metals of group VIII of the periodic table, such as nickel, iron, cobalt, platinum, palladium, or rhodium; group VIII metals supported on pumice, asbestos, kieselguhr, alumina, silica gel, or charcoal; palladium or platinum black, colloidal palladium or platinum; and platinum sponge. The amount of catalyst employed depends upon such reaction variables as temperature, pressure, duration of run, etc., and is not critical in that an excess of catalyst has no deleterious effects on the yield of tetramines obtained by the present process. Moreover, after completion of the hydrogenation, the catalyst may be removed from the reaction mixture by filtration and regenerated by a conventional method. Quantities of catalyst as low as one part per million parts of nitro compound are operable, but larger amounts are preferred in order to permit shorter reaction periods.

Both the reaction of the nitro cycloalkane, formaldehyde, and the piperazine and the hydrogenation step may be effected at a temperature within the range of the freezing point of the mixture and the boiling point of the mixture under the reaction conditions. However, the use of a temperature within the range of 20° C. and the boiling point of the mixture under the reaction conditions provides good yields and is preferable from the viewpoint of economics. The use of lower temperatures requires external cooling and longer reaction times; the use of higher temperatures may cause the loss of constituents of the mixture. The use of pressure in the initial reaction step, of course, permits the use of higher temperatures and subsequently a quickening of the reaction.

In effecting the hydrogenation of the dinitro compound, pressures ranging from atmospheric pressure up to the maximum pressure permitted by the mechanical limitations of available equipment can be employed, i.e., 1–1000 atmospheres. Although entirely satisfactory yields of the tetramines are obtained when atmospheric pressure is used, the use of higher pressures is advantageous because thereby the reaction rate is increased and the reaction time is decreased.

Example 1 describes a means of separating the dinitro compounds produced by the process of the present invention. For example, after completion of the reaction, the solid material is removed from the reaction mixture by filtration and is slurried in an alkanol. The slurry is filtered, and the solid residue is dried. The dinitro compounds may be purified further by recrystallization from a suitable solvent, e.g., benzene. The separation step, of course, may be omitted, and the hydrogen may be contacted with the crude product mixture from the initial reaction after the catalyst has been added to the crude mixture. Solid N,N'-bis[(1-aminocycloalkyl)methyl] piperazines are separated from reaction mixtures by filtering off the catalyst and insoluble material, distilling off the solvent, slurrying the solid residue from the distillation in a suitable solvent, e.g., acetone, and thereafter filtering off the tetramine, which may be purified further by recrystallization from a suitable solvent. Liquid products may be separated by filtering off the catalyst, distilling off the solvent, and distilling the residue at reduced pressure.

Although the process of the present invention has been illustrated by the production of novel dinitro compounds from nitrocyclohexane and nitrocyclopentane and the hydrogenation of the resultant nitro compounds, the use of other nitro cycloalkanes in the initial step is equally feasible, as is the hydrogenation of the resultant nitro compounds derived from the other nitro cycloalkanes. For example, nitrocycloheptane may be substituted for either nitrocyclohexane or nitrocyclopentane.

Although the preceding examples illustrate the process as a batchwise process, the process of the present invention also may be carried out in a continuous manner. For example, the nitro cycloalkane, formaldehyde, and the piperazine can be added to the reaction zone continuously in a manner such that substantially stoichiometric amounts of the reactants are maintained in said zone, while the nitro compound product is continuously removed from said zone and introduced into a hydrogenation zone containing the catalyst, hydrogen being passed continuously into the hydrogenation zone from which the tetramine is removed continuously.

The invention has been described in detail in the foregoing. It will be apparent to those skilled in the art that many variations are possible without departure from the scope of the invention. I intend, therefore, to be limited only by the following claims.

I claim:

1. A new composition of matter selected from the group consisting of N,N'-bis[(1-aminocycloalkyl)methyl] piperazine and N,N'-bis[(1-aminocycloalkyl)methyl] C-alkyl substituted piperazines.

2. A process for the preparation of N,N'-bis[(1-aminocycloalkyl)methyl]piperazines which comprises hydrogenating a member selected from the group consisting of N,N'-bis[(1-nitrocycloalkyl)methyl]piperazine and N,N'-bis[(1-nitrocycloalkyl)methyl] C-alkyl substituted piperazines in the presence of a hydrogenation catalyst.

3. A process for the preparation of N,N'-bis[(1-aminocycloalkyl)methyl]piperazines which comprises hydrogenating a member selected from the group consisting of N,N'-bis[(1-nitrocycloalkyl)methyl]piperazine and N,N'-bis[(1-nitrocycloalkyl)methyl] C-alkyl substituted piperazines in the presence of a hydrogenation catalyst and in a slurry with a solvent for the tetramines selected from the group consisting of low-molecular-weight alkanols and mixtures of a low-molecular-weight alkanol and water.

4. A process for the preparation of N,N'-bis[(1-aminocycloalkyl)methyl]piperazines which comprises hydrogenating a member selected from the group consisting of N,N'-bis[(1-nitrocycloalkyl)methyl]piperazine and N,N'-bis[(1-nitrocycloalkyl)methyl] C-alkyl substituted piperazines in the presence of a hydrogenation catalyst and in a slurry with a solvent for the tetramines selected from the group consisting of low-molecular-weight alkanols and mixtures of a low-molecular-weight alkanol and water at a temperature within the range of 20° C. and the boiling point of the mixture under the reaction conditions.

5. A process for the preparation of N,N'-bis[(1-aminocycloalkyl)methyl]piperazines which comprises hydrogenating a member selected from the group consisting of N,N'-bis[(1-nitrocycloalkyl)methyl]piperazine and N,N'-bis[(1-nitrocycloalkyl)methyl] C-alkyl substituted piperazines in the presence of a hydrogenation catalyst from the group consisting of low-molecular-weight alkanols and mixtures of a low-molecular-weight alkanol and water at a temperature within the range of 20° C. and the boiling point of the mixture under the reaction conditions, removing insoluble material from said reaction mixture, and thereafter recovering said tetramine.

6. Process according to claim 3, wherein the hydrogenation is carried out at a pressure within the range of atmospheric pressure and 1000 atmospheres.

7. Process according to claim 3, wherein the hydrogenation catalyt is a nickel catalyst.

8. N,N'-bis[(1-aminocyclohexyl)methyl]piperazine.

9. A process for the preparation of N,N'-bis[(1-aminocyclohexyl)methyl]piperazine which comprises hydrogenating N,N'-bis[(1-nitrocyclohexyl)methyl]piperazine in the presence of a hydrogenation catalyst and in a slurry with a solvent for the tetramine selected from the group consisting of low-molecular-weight alkanols and mixtures of a low-molecular-weight alkanol and water at a temperature within the range of 20° C. and the boiling point of the mixture under the reaction conditions, removing insoluble material from said reaction mixture, and thereafter recovering said tetramine.

10. N,N'- bis[(1-aminocyclohexyl)methyl] - 2 - methylpiperazine.

11. A process for the preparation of N,N'-bis[(1-aminocyclohexyl)methyl]-2-methylpiperazine which comprises hydrogenating N,N'- bis[(1 - nitrocyclohexyl)methyl] - 2 - methylpiperazine in the presence of a hydrogenation catalyst and in a slurry with a solvent for the tetramine selected from the group consisting of low-molecular-weight alkanols and mixtures of a low-molecular-weight alkanol and water at a temperature within the range of 20° C. and the boiling point of the mixture under the reaction conditions, removing insoluble material from said reaction mixture, and thereafter recovering said tetramine.

12. N,N'-bis[(1-aminocyclohexyl)methyl]-2,5-dimethyl piperazine.

13. A process for the preparation of N,N'-bis[(1-aminocyclohexyl)methyl]-2,5-dimethylpiperazine which comprises hydrogenating N,N'-bis[(1-nitrocyclohexyl)methyl]-2,5-dimethylpiperazine in the presence of a hydrogenation catalyst and in a slurry with a solvent for the tetramine selected from the group consisting of low-molecular-weight alkanols and mixtures of a low-molecular-weight alkanol and water at a temperature within the range of 20° C. and the boiling point of the mixture under the reaction conditions, removing insoluble material from said reaction mixture, and thereafter recovering said tetramine.

14. N,N'-bis[(1-aminocyclopentyl)methyl]piperazine.

15. A process for the preparation of N,N'-bis[(1-aminocyclopentyl)methyl]piperazine which comprises hydrogenating N,N'-bis[(1-nitrocyclopentyl)methyl]piperazine in the presence of a hydrogenation catalyst and in a slurry with a solvent for the tetramine selected from the group consisting of low-molecular-weight alkanols and mixtures of a low-molecular-weight alkanol and water at a temperature within the range of 20° C. and the boiling point of the mixture under the reaction conditions, removing insoluble material from said reaction mixture, and thereafter recovering said tetramine.

16. A new composition of matter selected from the group consisting of N,N'-bis[(1-nitrocycloalkyl)methyl]piperazine and N,N'-bis[(1-nitrocycloalkyl)methyl] C-alkyl substituted piperazines.

17. A process for the preparation of N,N'-bis[(1-nitrocycloalkyl)methyl]piperazines which comprises mixing a mononitro cycloalkane, formaldehyde, and a piperazine selected from the group consisting of piperazine and piperazines C-substituted by low-molecular-weight alkyl groups.

18. A process for the preparation of N,N'-bis[(1-nitrocycloalkyl)methyl]piperazines which comprises mixing a mononitro cycloalkane, formaldehyde, and a piperazine selected from the group consisting of piperazine and piperazines C-substituted by low-molecular-weight alkyl groups at a temperature within the range of 20° C. and the boiling point of the mixture.

19. Process according to claim 18, wherein the mononitro cycloalkane, formaldehyde, and the piperazine are used in substantially stoichiometric amounts.

20. Process according to claim 18, wherein the mononitro cycloalkane, formaldehyde, and the piperazine are mixed in the presence of a catalyst selected from the group consisting of organic and inorganic bases.

21. A process for the preparation of N,N'-bis[(1-nitrocycloakyl)methyl]piperazines which comprises mixing a mononitrocycloalkane, formaldehyde, and a piperazine selected from the group consisting of piperazine and piperazines C-substituted by low-molecular-weight alkyl groups in an aqueous solution of a 1–3 carbon alkanol at a temperature within the range of 20° C. and the boiling point of the mixture.

22. A process for the preparation of N,N'-bis[(1-nitrocycloalkyl)methyl]piperazines which comprises mixing a mononitro cycloalkane formaldehyde, and a piperazine selected from the group consisting of piperazine and piperazine C-substituted by low-molecular-weight alkyl groups in an aqueous solution of a 1–3 carbon alkanol at a temperature within the range of 20° C. and the boiling point of the mixture, and thereafter recovering said dinitro compounds.

23. N,N'-bis[(1-nitrocyclohexyl)methyl]piperazine.

24. A process for the preparation of N,N'-bis[(1-nitrocyclohexyl)methyl]piperazine which comprises mixing nitrocyclohexane, formaldehyde, and piperazine in an aqueous solution of a 1–3 carbon alkanol at a temperature within the range of 20° C. and the boiling point of the mixture, and thereafter recovering said dinitro compound.

25. N,N' - bis[1 - nitrocyclohexyl)methyl] - 2 - methylpiperazine.

26. A process for the preparation of N,N'-bis[(1-nitrocyclohexyl)methyl]-2-methylpiperazine which comprises mixing nitrocyclohexane, formaldehyde, and 2-methylpiperazine in an aqueous solution of a 1–3 carbon alkanol at a temperature within the range of 20° C. and the boiling point of the mixture, and thereafter recovering said dinitro compound.

27. N,N' - bis[(1 - nitrocyclohexyl)methyl] - 2,5 - dimethylpiperazine.

28. A process for the preparation of N,N'-bis[(1-nitrocyclohexyl)methyl]-2,5-dimethylpiperazine which comprises mixing nitrocyclohexane, formaldehyde, and 2,5-dimethylpiperazine in an aqueous solution of a 1–3 carbon alkanol at a temperature within the range of 20° C. and the boiling point of the mixture, and thereafter recovering said dinitro compound.

29. N,N'-bis[(1-nitrocyclopentyl)methyl]piperazine.

30. A process for the preparation of N,N'-bis[(1-nitrocyclopentyl)methyl]piperazine which comprises mixing nitrocyclopentane, formaldehyde, and piperazine in an aqueous solution of a 1–3 carbon alkanol at a temperature within the range of 20° C. and the boiling point of the mixture, and thereafter recovering said dinitro compound.

No references cited.

UNITED STATES PATENT OFFICE

CERTIFICATE OF CORRECTION

Patent No. 2,887,488

May 19, 1959

Robert A. Smiley

It is hereby certified that error appears in the printed specification of the above numbered patent requiring correction and that the said Letters Patent should read as corrected below.

Column 5, line 33, for "68,67," read -- 68.67, --; column 6, line 4, for "piperazines" read -- piperazine --; column 8, line 26, after "catalyst" insert -- and in a slurry with a solvent for the tetramines selected --.

Signed and sealed this 15th day of December 1959.

(SEAL)
Attest:

KARL H. AXLINE
Attesting Officer

ROBERT C. WATSON
Commissioner of Patents